Dec. 22, 1959 W. C. KNOEBEL 2,918,340
PISTON RING ASSEMBLY
Filed Dec. 19, 1958
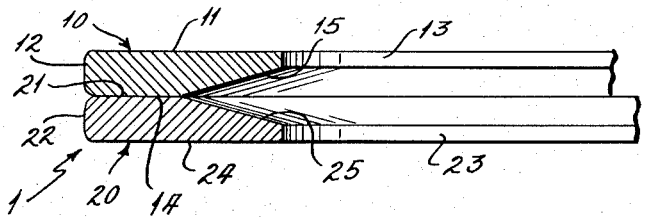
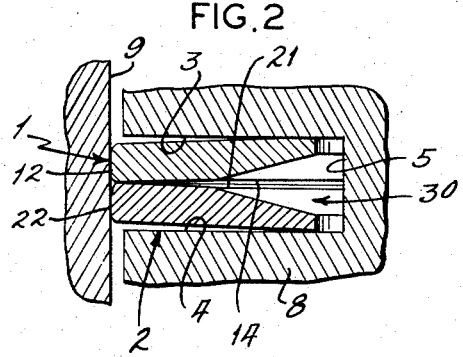 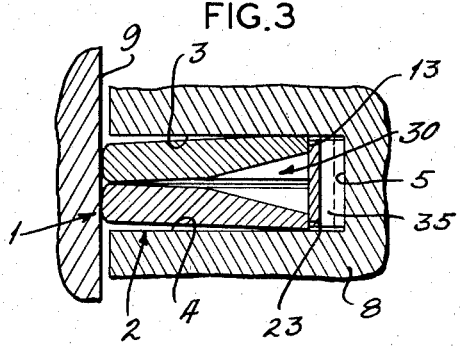
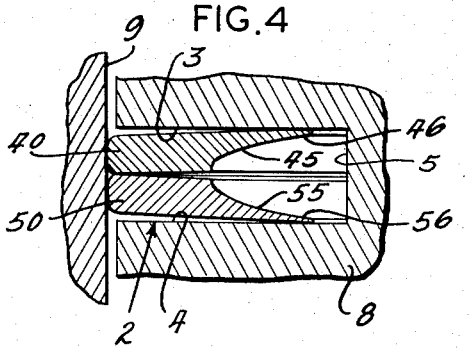 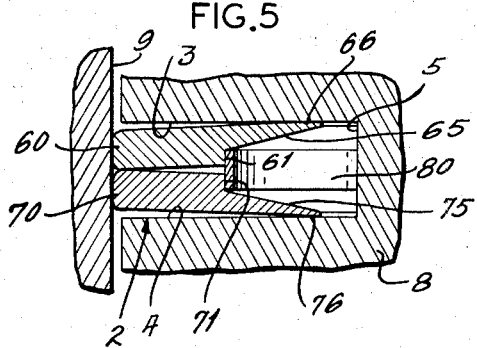
INVENTOR:
WALTER C. KNOEBEL
BY Sutherland, Polster & Taylor
ATTORNEYS.

United States Patent Office 2,918,340
Patented Dec. 22, 1959

2,918,340

PISTON RING ASSEMBLY

Walter C. Knoebel, St. Louis County, Mo., assignor to McQuay-Norris Manufacturing Company, St. Louis, Mo., a corporation of Delaware Application December 19, 1958, Serial No. 781,598

2 Claims. (Cl. 309—44)

This invention relates to piston rings, and in particular to a combination oil and compression ring assembly.

Originally, when the automobile first became popular, internal combustion engines were of slow speed, and low performance rating. Ordinarily, three piston rings of identical cross-section and radial pressure were used both to prevent the loss of pressure from the combustion chamber and to control the movement of oil by the piston into the combustion chamber. At first, the oil thrown against the cylinder wall was scraped up toward the combustion chamber by the piston rings as much as it was scraped down toward the crank case, since the rings had identical scraping edges top and bottom.

This condition was ameliorated, if not overcome, by rounding the top edges of the rings, tapering the faces of the rings, grooving the faces of the rings circumferentially, and drilling holes, in the grooves, at the bottom of the scraping edge. These expedients were reasonably successful at the slow speeds at which the engines were then run, since the tendency for the oil to move from the direction of the crankcase to the combustion chamber was counteracted not only by the scraping of the rings, but by the pressure differential between the combustion chamber and crankcase on the compression and explosion strokes of the piston, which tended to blow the oil back to the crankcase during two of the four cycles, while the suction stroke tended to move the oil in the opposite direction on only one of the four. There was no appreciable pressure differential on the exhaust stroke.

As engine speeds increased, increasing the speed of movement of the rings over the surface of the cylinder, the straight bearing surfaces of the rings developed a tendency to plane over the surface of the oil film on the cylinder, in much the way in which a racing boat planes over the surface of the water. This phenomenon was the result of the development of pressure between the face of the ring and the oil film, which held the ring away from the surface of the cylinder. To offset this planing tendency, the common compression rings were constructed to bear more tightly against the cylinder wall, but eventually a practical limit to the overall outward pressure which could be obtained with the materials available, was reached.

Since the practical overall pressure available was limited, and since what was desired in controlling the movement of oil was to cut through the surface of the film of oil to reduce the thickness of the film, the bearing surface of the face of the ring was reduced, thereby producing a much higher unit pressure in the remaining bearing portion of the ring face. Thus, if the total outward force on the ring remained constant, and the bearing surface area were made only one-half to one-third as great as the original bearing surface, the pressure exerted along the remaining bearing face would be double to triple the pressure previously available.

In order to reduce the bearing surface, the center of the ring face was relieved, and since pressures built up in the relieved portion, grooves and slots were made radially through the central section of the ring, to eliminate this pressure. Such a ring is exclusively an oil ring, having no real function for compression purposes. It is, accordingly, positioned in the bottom ring groove, farthest from the head of the piston.

Eventually, the faces of the oil rings were reduced to the point where only a few thousandths of an inch of width of scraping edge remained. Additional pressure was applied to the rings by means of springs, bearing against the bottom of the ring groove, forcing the rings radially outwardly. These oil rings are in common use today.

Such an oil ring, in the third groove of the ring belt, works satisfactorily to control the movement of oil in high speed engines operating at or near full load. Oil consumption at high speeds is being adequately controlled today with rings exerting a pressure of up to four-hundred pounds per square inch, in the third groove.

A new problem, however, has arisen with the powerful engines presently being produced. A prominent automobile maker, for example, recently announced that only 10% of the total horsepower of their engine is used when the automobile is traveling at 50 miles an hour. Under such circumstances, the throttle is practically closed, since closing the throttle is the only means of reducing the power of the engine to 10% of its capacity. This means that on the suction stroke, vacuums as high as 18 to 20 inches of mercury will be maintained at 50 miles an hour on a straight run, while on a slow-down they may well run as high as 26 to 27 inches of mercury.

Not only is a high vacuum formed on the suction stroke with the nearly-closed throttle, but the two pressure strokes are rendered substantially less effective. With a partially closed throttle, less air and gas mixture is drawn into the combustion chamber, causing a relatively weak compression pressure. With a relatively small volume of air-gas mixture, under low pressure, the explosion and expansion are correspondingly weak, so that the tendency for oil to be pumped from the direction of the crank case to the combustion chamber is magnified. It can be appreciated that the problem is correspondingly greater at low speeds and with frequent slowing up, as in the usual city driving.

One of the objects of this invention is to provide a piston ring assembly which will overcome the tendency of internal combustion engines to pump an undue amount of oil to the combustion chamber, and at the same time will improve the compression holding ability of the engine.

Another object is to provide such a ring assembly which is inexpensive and is simple to manufacture and install.

Other objects will become apparent to those skilled in the art in the light of the following description and accompanying drawing.

In accordance with this invention, generally stated, a piston ring assembly is provided in which two rings are contained in a single piston ring groove. The two rings are arranged to exert a flexible pressure against the upper and lower sides of the ring groove, and to bear on one another in the area of their outer peripheries.

The arrangement of the two rings is such as to provide a chamber between the bottom of the ring groove and the area at which the rings bear on one another. This chamber serves as a trap, to which oil is admitted by a check valve-like action of the ring. This pressure acts both to counteract the tendency of the oil to try to creep around behind the ring assembly, and also tends to increase the outward radial load of the piston ring assembly.

Provision may be made for an expander, to exert additional outward radial pressure on the ring assembly.

In the drawing, Figure 1 is a fragmentary sectional view of two rings of a ring assembly constructed in accordance with one illustrative embodiment of this invention, in their relaxed condition;

Figure 2 is a fragmentary sectional view of the rings of the assembly shown in Figure 1, installed in the piston ring groove of a piston, within a cylinder;

Figure 3 is a fragmentary sectional view of the assembly as shown in Figure 2, with an expander;

Figure 4 is a fragmentary sectional view of a piston ring assembly constructed in accordance with another embodiment of this invention, the assembly being mounted in a piston ring groove in a piston within a cylinder; and Figure 5 is a fragmentary sectional view of a piston ring assembly constructed in accordance with still another embodiment of this invention mounted in a piston ring groove in a piston within a cylinder.

Referring now to Figures 1 and 2 of the drawing for one illustrative embodiment of this invention, reference numeral 1 indicates a complete piston ring assembly. In Figure 2 the assembly 1 is mounted in a piston ring groove 2 in a piston 8, within a cylinder defined by a cylinder wall 9. The piston ring groove 2 has an upper side 3, a lower side 4 and a bottom 5.

The piston ring assembly 1 is made up of an upper ring 10 and a lower ring 20. The rings 10 and 20 are thicker (greater in radial extent) than they are wide (in axial extent).

The ring is provided with the usual slot, not shown. The upper ring 10 has an upper side 11, an outer face 12, an inner face 13, a lower side 14 and a chamfer 15 between the inner face 13 and the lower side 14.

The lower ring 20 has an upper side 21, an outer face 22, an inner face 23, a lower side 24 and a chamfer 25 between the upper side 21 and the inner face 23.

In their relaxed, uncompressed condition, as shown in Figure 1, the rings 10 and 20 lie flat, the lower side 24 of the lower ring 20 and the upper side 11 of the upper ring 10 being parallel, and the lower side 14 of the upper ring 10 and the upper side 21 of the lower ring 20 being in contact through substantially their entire thickness.

When the rings are put into the ring groove 2, and subsequently compressed within the cylinder, the rings distort. The upper ring 10 twists so that the inner face 13 moves upwardly with respect to the outer face 12, while the lower ring 20 twists in such a way that the inner face 23 moves downwardly with respect to the outer face 22. Thus, the upper side 11 and the lower side 20 are no longer parallel, but are disposed to converge outwardly. This twisting of the two rings causes the inside surface of the upper side 11 to bear strongly against the upper side 3 of the ring groove 2, and the inner surface of the lower side 24 of the ring 20 to bear strongly against the lower side 4 of the ring groove 2. At the same time, the lower side 14 of the upper ring and the upper side 21 of the lower ring contact one another strongly in the outer peripheral area of those sides, as shown in Figure 2.

The divergence of the inner edges of the rings, and the chamfers 15 and 25 create a chamber 30 extending between the bottom 5 of the ring groove 2 and the area of contact near the outer periphery of the sides 14 and 21.

The piston ring assembly 1 is mounted in the ring groove 2 in the usual manner of compression rings. The chamfers 15 and 25 ensure that the rings 10 and 20 will twist in the desired direction when they are compressed.

In the operation of the piston ring assembly 1, oil which tends to move up the cylinder wall 9 from the crankcase toward the combustion chamber, will tend to try to go around the back of the ring assembly, through the pie shaped space between the lower side 24. It tends to raise the piston ring 20 from its engagement with the lower side of the ring groove, permitting the oil to get into the space 30. As the space 30 fills up, however, the oil pressure in the space 30 tends to force the ring assembly radially outwardly and axially apart, which increases the pressure of the inner surfaces of the sides 11 and 24 against the sides 3 and 4 respectively of the ring groove. Of course, the oil also tends to be forced past the outer peripheral contact area of the ring sides 14 and 21, but this is rather difficult, because the outside faces 12 and 22 of the rings are in firm contact with the cylinder wall 9. The oil in the chamber 30 also tends to try to go around the inner faces 13 and 23, but, as in the case of any reed type check valve, its passage in that direction is inhibited by its own pressure.

Any oil that does accumulate between the upper side of the ring 10 and the combustion chamber will tend to be blown back into the chamber 30 on the power stroke, and again, ingress of oil around the inner face 13 of the ring 10 is easier than its egress from the chamber 30 around the same face.

In Figure 3, an expander spring 35 is shown, bearing against the bottom 5 of the ring groove and against the inner faces 13 and 23 of the upper and lower rings respectively.

The operation of the assembly shown in Figure 3 is identical with that of the assembly shown in Figures 1 and 2, except that the expander 35 exerts additional initial outwardly radial pressure on the rings 10 and 20, before the oil pressure is built up in the chamber 30.

In Figure 4, an upper ring 40 and lower ring 50 are provided which differ from the rings 10 and 20 in the character of the chamfer. The upper ring 40 has a chamfer 45 and the lower ring 50 has a chamfer 55.

Both of the chamfers 45 and 55 are curved and, toward the inner edge of the rings reduce the width of the inner face of each ring enough to produce flexible sections 46 and 56 in the upper and lower rings respectively. In this embodiment, the entrapment of the oil in the chamber between the bottom of the ring groove and the contact area of the two rings on one another is facilitated by the increased flexibility of the sections 46 and 56 themselves. As the pressure of oil in the chamber builds up, the flexible sections 46 and 56 tend to be forced into contact with the sides of the ring groove over an even larger area than is the case with the ring groove contacting parts of the assembly of Figures 1–3.

In Figure 5, an upper ring 60 is provided with an annular inside shoulder 61, at the base of which is a chamfer 65. A lower ring 70 is provided with an annular inside shoulder 71 from the base of which extends chamfer 75. As shown in the embodiment of Figure 4, the chamfers 65 and 75 closely approach the sides of the rings engaging the sides of the ring groove, to form flexible sections 66 and 76. An expander spring 80 is compressed between the bottom of the ring groove and the shoulders 61 and 71, urging the rings 60 and 70 radially outwardly against the cylinder wall.

The operation of the ring assembly shown in Figure 5 is the same as that shown in Figure 4, except that the expander spring 80 gives additional outward radial bias to the rings 60 and 70.

The ring assemblies of this invention are preferably installed in an intermediate ring groove, between the fire ring (the uppermost compression ring), and the oil ring (generally the lowermost ring). For example, in a piston having three ring grooves, a ring assembly of this invention should be in the center, second groove. In a piston having more than three ring grooves, a ring assembly of this invention should be in an intermediate groove, preferably immediately above the oil ring.

In this arrangement, the fire ring, the compression ring in the first ring groove, adjacent the head of the piston, is permitted to function normally. This fire ring in the top groove, which must handle about 80% of the pressure, temperature, and dirt, all in the most poorly lubricated section of the cylinder, is not adapted to be used as an oil ring. It has already been noted that the oil ring in the ring groove most remote from the head serves no other function than to control the amount of oil which moves toward the combustion chamber. This "high speed" oil ring is also permitted to perform its usual function. The center ring, however, which has heretofore normally been a compression ring, is not subjected to the extreme temperature, pressure, and dirt conditions to which the fire ring is exposed, and accordingly is utilized in the assembly of this invention, as a combination compression and oil ring.

The extent and configuration of the chamfer in any embodiment of this invention is such as to produce sufficient flexibility in the rings to permit oil to force its way into the chamber behind the ring, and to permit the pressure of oil in the chamber to flex the rings outwardly into firm engagement with sides of the piston ring groove.

The rings of the piston ring assembly of this invention should be thicker (radially) than they are wide (axially) by a substantial amount. Preferably, the ratio of thickness to width is in the neighborhood of 4½ to 1. In the embodiment of ring assembly shown in Figures 1 and 2, by way of illustration, the rings used in a ring groove .080 inch in width and .201 inch in depth, on a 3¾ inch diameter piston, may have a width of .039 inch and a thickness of .187 inch. The distance between the outer face of the ring and the near edge of the chamfer can be .094 inch, and the chamfer angle can be about 10°.

In the embodiment shown in Figure 3, the rings can have approximately the same configuration as those shown in Figures 1 and 2, but will generally be less thick, to accommodate the expander spring. Thus, for example, the rings may be .165 inch thick, and .039 inch wide, and the distance between the outside face of the ring and the near edge of the chamfer, .081 inch. The chamfer angle can still be about 10°.

In the embodiment shown in Figures 4 and 5, the width and thickness of the rings can correspond with those of Figures 1 and 3 respectively. In the embodiments of Figures 4 and 5, however, the width of the ring at its inner edge may be only a few (for example less than 10) thousandths of an inch. For some applications it may be desirable to make the inside edge of the ring substantially a knife edge, so as to provide the desired reed-like flexibility.

The usual end clearance, around 20 thousandths is provided where the ring is split.

Numerous variations in the construction of this invention, within the scope of the appended claims will occur to those skilled in the art in the light of the foregoing disclosure. For example, a top ring like the top ring shown in Figures 1 and 2 may be used with a bottom ring like the bottom ring shown in Figure 4 or vice versa, depending upon the kind and amount of pressure imbalance between the combustion chamber and the crankcase.

Thus it can be seen that a simple, effective piston ring assembly is provided which serves to reduce the amount of oil pumped by modern high speed, high powered engines at a small part of their full capacity, and which improves the compression holding ability of those engines.

Having thus described the invention, what is claimed and desired to be secured by Letters Patent is:

1. A piston ring assembly for use in a ring groove of a piston in a cylinder of an internal combustion engine, comprising an upper ring and a lower ring, said upper ring having a chamfer between its lower side and its inner face and said lower ring having a chamfer between its upper side and its inner face, said rings being thick as compared with their width, the lower side of said upper ring and the upper side of said lower ring engaging one another at the outer peripheral area of said sides, and the inner area of the upper side of the upper ring engaging the upper side of the ring groove and the inner area of the lower side of the lower ring engaging the lower side of the ring groove when the ring assembly is compressed within a ring groove, the chamfer of at least one of said rings providing a flexible, reed-like section at the inner peripheral area of the ring, said section being sufficiently flexible to permit access of oil under the pressures developed in the engine, to the chamber defined between the bottom of the ring groove and the said chamfers.

2. A piston ring assembly for use in a ring groove of a piston in a cylinder of an internal combustion engine, comprising an upper ring and a lower ring, said upper ring having a chamfer between its lower side and its inner face and said lower ring having a chamfer between its upper side and its inner face, said rings being provided with an annular shoulder radially outward of the chamfers and between the chamfers, said rings being thick as compared with their width, the lower side of said upper ring and the upper side of said lower ring engaging one another at the outer peripheral area of said sides, and the inner area of the upper side of the upper ring engaging the upper side of the ring groove and the inner area of the lower side of the lower ring engaging the lower side of the ring groove when the ring assembly is compressed within a ring groove, the chamfer of at least one of said rings providing a flexible, reed-like section at the inner peripheral area of the ring, said section being sufficiently flexible to permit access of oil under the pressures developed in the engine, to the chamber defined between the bottom of the ring groove and the said chamfers.

References Cited in the file of this patent

UNITED STATES PATENTS

| | | |
|---|---|---|
| 1,708,816 | Williams | Apr. 9, 1929 |
| 2,160,379 | Carroll | May 30, 1939 |